United States Patent Office 2,721,281
Patented Oct. 18, 1955

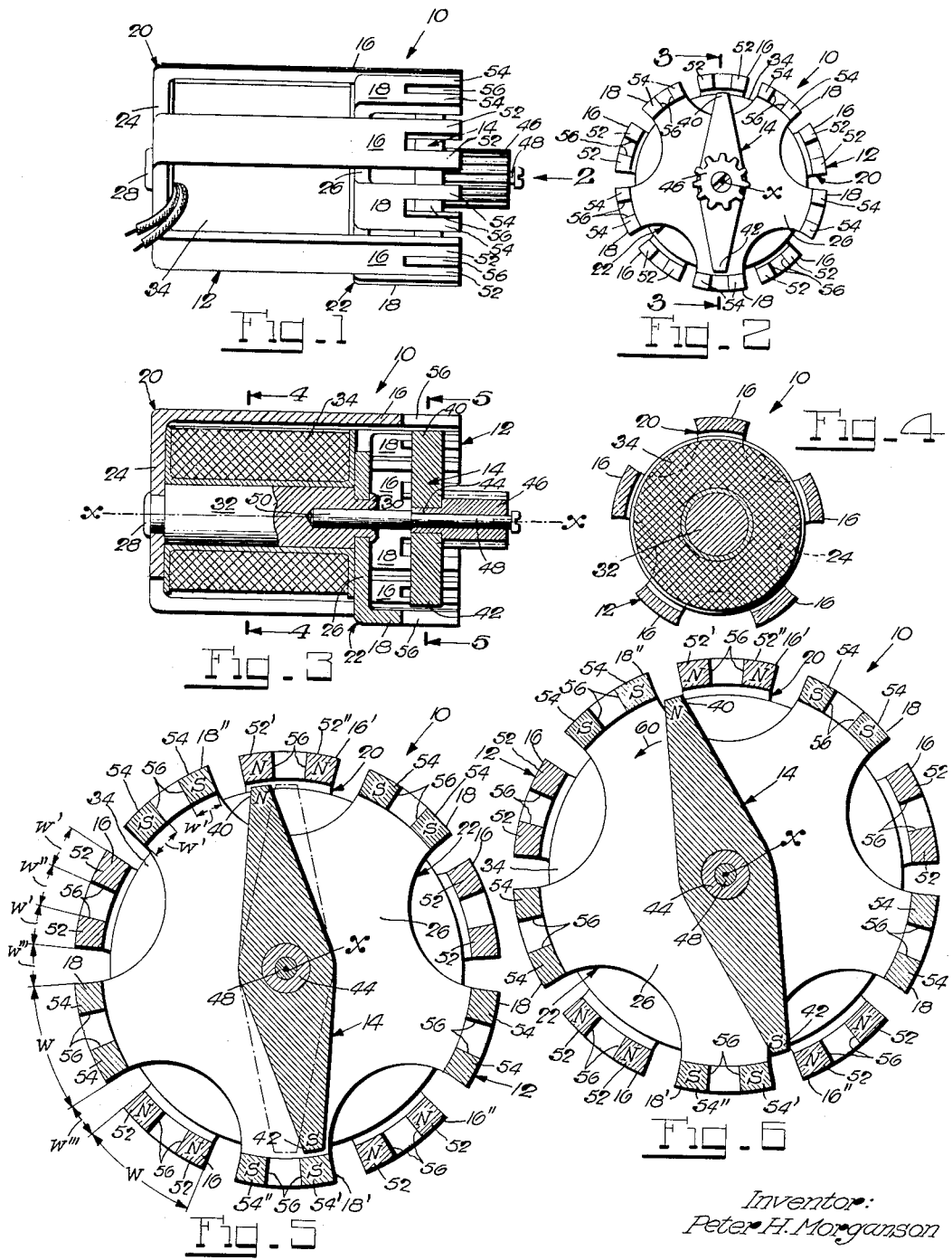
Oct. 18, 1955 — P. H. MORGANSON — 2,721,281
SELF-STARTING SYNCHRONOUS MOTOR
Filed Dec. 11, 1953 — 2 Sheets-Sheet 1
Inventor:
Peter H. Morganson
by: Stewart & Spruzel
Attorneys

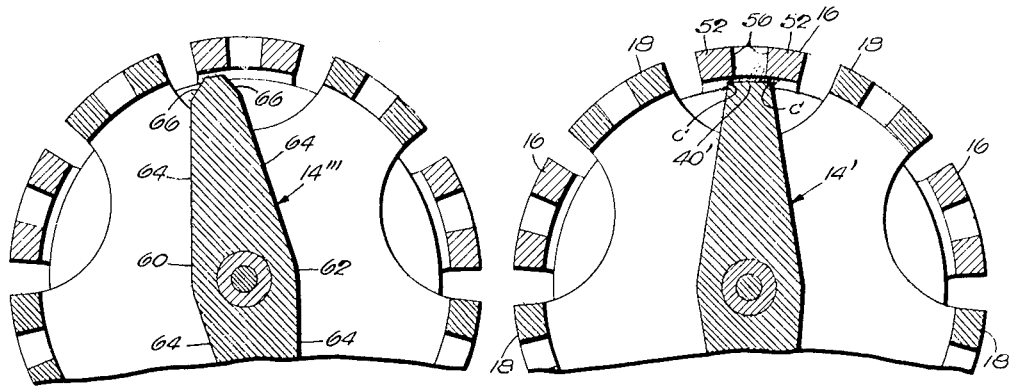
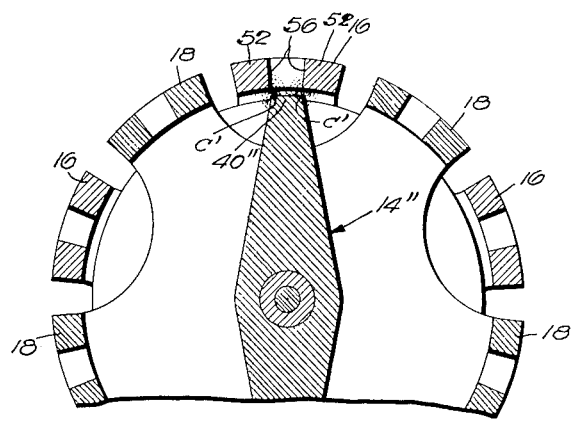
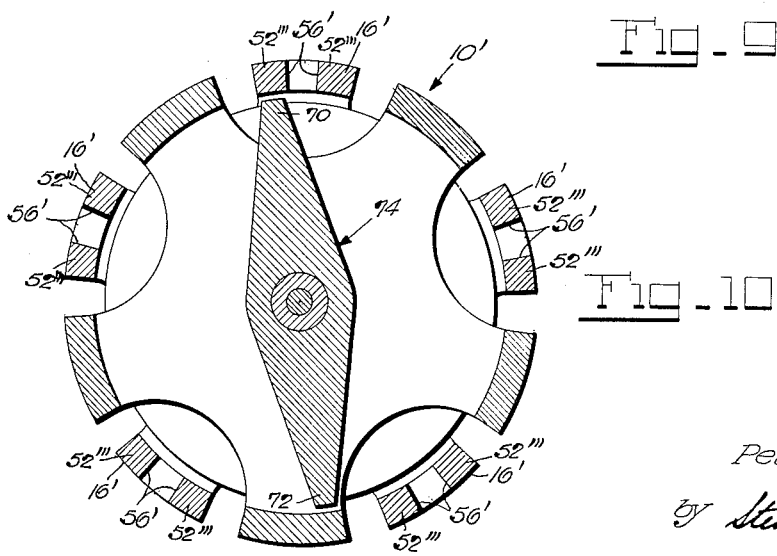

2,721,281

SELF-STARTING SYNCHRONOUS MOTOR

Peter H. Morganson, Winsted, Conn., assignor to The William L. Gilbert Clock Corporation, Winsted, Conn., a corporation of Connecticut Application December 11, 1953, Serial No. 397,719

17 Claims. (Cl. 310—162)

This invention relates to synchronous motors of the self-starting type.

The motor to which the present invention relates is of the kind having a multi-polar field of which alternate poles are of opposite signs or polarities at any given instance and change their polarities in phase with an alternating current supplied to an associated field coil, and a permanent-magnet type rotor the poles of which cooperate with the field poles in driving the rotor in synchronism with the alternation of the current. In order to render motors of this kind self-starting, shaded poles were heretofore usually provided among their field poles. However, the provision of shaded poles is rather expensive and they require additional material and space, all of which is not conducive to their use in relatively small and inexpensive motors suited for operating clock mechanisms or other timing devices, for instance.

It is the primary aim and object of the present invention to provide a motor of this kind which is assuredly self-starting, yet may be manufactured in a smaller size and at lower cost than a motor of comparable performance having shaded poles for self-starting.

It is another object of the present invention to provide a motor of this kind in which the field poles are so coordinated with each other and with the poles of the permanently magnetic rotor that the latter will, on deenergization of the field coil, be attracted by adjacent field poles into any one of a number of repose positions from which the same will, on reenergization of the field coil, unfailingly be expelled with sufficient force to assure instantaneous start and continued running of the rotor and, hence, of the motor.

It is a further object of the present invention to form the field poles and rotor poles so that the rotor will, when stopping on deenergization of the field coil, unfailingly be attracted to the then nearest pair of opposite field poles into a repose position which is off-center from the latter and in which the rotor is differently spaced from the next nearest field poles on opposite sides of its poles, thereby to achieve not only assured instantaneous self-starting of the motor when the field coil is energized, but high starting torque of the motor as well.

Another object of the present invention is to provide a self-starting motor of this kind in which the rotor is, on deenergization of the field coil, compelled into any one of its aforementioned off-center repose positions with respect to the nearest field poles by the simple expediency of notching at least one of each pair of associated opposite field poles of opposite polarities to provide spaced pole sections thereat, and so dimensioning the pole ends of the rotor that either one of the pole sections of a notched field pole adjacent to which the rotor may come to a stop will attract the adjacent pole end of the rotor and thus drag the latter from any possible repose position centrally of the nearest field poles.

A further object of the present invention is to provide a self-starting motor of this kind in which the pole ends of the rotor are so narrow as to preclude all possibility of a sufficiently powerful flux linkage between the corners of a rotor pole and the pole sections of an adjacent notched field pole to hold the rotor in stable or even unstable equilibrium in a central repose position in which the rotor pole would extend across the gap between the pole sections of the adjacent notched field pole, thereby giving even greater assurance that the rotor will always come to rest in an off-center position with respect to the nearest field poles, and will in consequence self-start instantaneously and without the slightest hesitation on each energization of the field coil.

It is another object of the present invention to provide a self-starting motor of this kind of which the field structure and rotor may be blanked from sheet stock and the field structure finish-formed, all in simple die operations and without requiring any machining or other finish-operation whatsoever, and these parts together with the field coil may subsequently be assembled in a quick and simple manner, so that the motor lends itself to efficient mass production at exceedingly low cost.

Further objects and advantages will appear to those skilled in the art from the following, considered in conjunction with the accompanying drawings.

In the accompanying drawings, in which certain modes of carrying out the present invention are shown for illustrative purposes:

Fig. 1 is a side view of a motor embodying the present invention;

Fig. 2 is an end view of the same motor as seen in the direction of the arrow 2 in Fig. 1;

Fig. 3 is a longitudinal section through the motor as taken on the line 3—3 of Fig. 2;

Fig. 4 is a cross-section through the motor as taken on the line 4—4 of Fig. 3;

Fig. 5 is an enlarged cross-section through the motor as taken on the line 5—5 of Fig. 3, and showing the rotor in one of its repose positions;

Fig. 6 is a section similar to Fig. 5, but showing the rotor of the motor in a running position;

Fig. 7 is a fragmentary section similar to Fig. 5, and showing a modified rotor in one of its repose positions;

Figs. 8 and 9 are fragmentary sections similar to Fig. 7 and showing different rotor constructions of inferior starting characteristics; and Fig. 10 is a section through a motor embodying the present invention in another modified manner.

Referring to the drawings, and more particularly to Figs. 1 to 6 thereof, the reference numeral 10 designates an electric motor having a field structure 12 and an armature or rotor 14. The field structure 12 comprises two sets of field poles 16 and 18 which are provided by separate field pieces 20 and 22, respectively. The field piece 20 includes a star-shaped base plate 24 (Figs. 3 and 4) having forwardly projecting fingers which in this instance are equiangularly spaced and constitute the field poles 16. The other field piece 22 includes a star-shaped base plate 26 (Figs. 2, 3 and 5) having forwardly projecting fingers which are also equi-angularly spaced and constitute the field poles 18. The field pieces 20 and 22 are made of any suitable non-permanent magnetic material.

The base plates 24 and 26 of the field pieces 20 and 22, respectively, are suitably secured, in this instance by riveting as at 28 and 30, to the opposite ends of a central post or core 32 (Fig. 3) so that the field poles 16 and 18 alternate and are arranged substantially circularly about the axis $x$ of the central core 32 in the fashion shown in Figs. 2, 5 and 6.

As shown in Figs. 3 and 4, a field coil 34 is placed around the central core 32 and between the base plates 24 and 26 of the field pieces 20 and 22, respectively. Single phase alternating current may be supplied to this coil from any suitable source. Since the base plates 24 and 26 of the field pieces 20 and 22, respectively, are located on opposite sides of the field coil 34, these field pieces are, during energization of the field coil, magnetized at any given instant in such a way that they are of opposite polarity. Acordingly, the alternate field poles 16 and 18 are of opposite polarity at any given instant, and their polarity changes in phase with the alternating current supplied to the field coil 34.

Referring now to the armature or rotor 14, the same is in the form of an elongated plate member, and is a permanent magnet having the opposite pole ends 40 and 42. The rotor 14 is in this instance mounted on a reduced shank 44 of a pinion 46 which is journalled on a reduced shank 48 of a stub shaft 50 that is pressfitted or otherwise mounted in the central core 32 (Fig. 3). Since the stub shaft 50 and its shank 48 extend coaxially of the central core 32, the common rotary axis of the pinion 46 and rotor 14 coincides with the axis $x$ of the central core 32. The pinion 46 serves for drivingly connecting the instant motor with a clock mechanism or any other timing device.

In the present instance, the field poles 16 and 18 of each set are provided in odd numbers so that field poles of both sets are diametrically opposite each other, permitting therefore the advantageous use of a well balanced rotor 14 having a straight line of symmetry and diametrically opposite pole ends 40 and 42. The field poles 16 and 18 of both sets are in this instance also of uniform width $w$ and are also equally spaced from each other (Fig. 5).

It is the important objective of this invention to render the instant motor self-starting. To this end, each one of the field poles 16 and 18 is at the level of the rotor 14 divided into two spaced sections 52 and 54, respectively. This may conveniently be achieved by simply matching notches 56 into the ends of the field poles to a depth like or similar to that shown in Figs. 1 and 3. Preferably, the pole sections 52 and 54 are of identical width $w'$ and the width $w''$ of each notch 56 is equal to the width of each pole section 52 or 54 (Fig. 5). Furthermore, the space or gap $w'''$ between adjacent field poles 16 and 18 is preferably also equal to the width of each pole section 52 or 54 (Fig. 5). For a reason explained hereinafter, the pole ends 40 and 42 are under no circumstances appreciably wider, and are preferably narrower, than the notches or gaps 56 between the pole sections 52 or 54.

Assuming now that the field coil 34 has just been deenergized and the rotor 14 is about to stop in the dot-and-dash line position in Fig. 5, the pole ends 40 and 42 of the rotor will then be attracted to the nearest pole sections, in this instance the pole sections 52' and 54', of the then demagnetized field poles 16' and 18', respectively, with the result that the rotor is dragged into the repose position shown in full lines in Fig. 5 in which the same is clearly off-center from the adjacent field poles 16' and 18'. While the motor remains idle, the rotor 14 will, due to its magnetic coupling with the adjacent pole sections 52' and 54', safely remain in its repose position. However, the rotor 14 will, on reenergization of the field coil 34, instantaneously be expelled from its repose position and keep on running in the direction in which it started. Thus, assuming that the pole ends 40 and 42 of the rotor 14 are of North and South polarities, respectively, and that the rotor is in the full-line repose position shown in Fig. 5, and assuming further that the field coil 34 be suddenly supplied with curent and that the polarities of the pole sections 52', 52" and 54', 54" of the field poles 16' and 18', respectively, be for the first time as indicated in Fig. 6, it then follows that these pole sections 52', 52" and 54', 54" will repel the pole ends 40 and 42 of the rotor and turn the latter in the direction of the arrow 60 (Fig. 6). While the rotor 14 is thus repelled from the pole sections of the field poles 16' and 18', the same is simultaneously attracted to the magnetized pole sections of the next adjacent field poles 18" and 16", as appears clearly from Fig. 6. Hence, the over-all force with which the rotor 14 is expelled from its repose position is quite considerable and results in unfailing instantaneous self-starting of the motor at high torque when the field coil 34 is energized, and in continued rotation of the rotor in the same direction while the field coil remains energized. If on energization of the field coil 34 the initial polarities of the field coils 16', 18' and 16", 18" would be opposite to those indicated in Fig. 6, the rotor would start from its exemplary repose position in the opposite direction, i. e. counter to the arrow 60 in Fig. 6, as will be readily understood. On the other hand, if the rotor 14 would assume a repose position in which the same is magnetically coupled to the pole sections 52" and 54" of the field poles 16' and 18', respectively, and if the initial polarities of these field poles on energization of the field coil 34 were as indicated in Fig. 6, the rotor would obviously start in a direction counter to that indicated by the arrow 60 in Fig. 6.

It is evident from the foregoing that the rotor 14 will, on deenergization of the field coil 34, always assume a repose position in which the same is magnetically coupled to either one of the spaced pole sections of the nearest field poles and in consequence is off-center from the latter and thus conditioned for instantaneous self-starting on reenergization of the field coil. The direction in which the rotor will start on reenergization of the field coil depends, as pointed out above, on the initial polarities of the field poles as well as on the alternative repose positions which the rotor may assume adjacent either pair of opposite pole sections of the adjacent field poles.

It has been mentioned hereinbefore that the width of the pole ends 40 and 42 of the rotor 14 be under no circumstances appreciably wider, and be preferably narrower, than the gap 56 between the pole sections of any field pole 16 or 18. Thus, it has been found that if the pole ends of a rotor 14' are wider than the gap 56 between the pole sections of any field pole 16 or 18, as shown in Fig. 8, the rotor may, on deenergization of the field coil, occasionally assume the illustrated central repose position in which the same may well be held by the concentrated flux from the corners $c$ of the rotor pole 40' to both pole sections 52 of the adjacent field pole 16, for instance, with the result that the rotor will, on reenergization of the field coil, start at best only after considerable hesitation.

Fig. 9 shows a rotor 14" the pole ends of which, one being shown at 40", are of the same width as the gaps 56 between the pole sections of either field poles 16 or 18. Even in this case the rotor 14" may occasionally come to the illustrated central repose position and be held therein by the powerful flux linkage between the corners $c'$ of the pole end 40" and both pole sections 52 of the adjacent field pole 16, for instance. While the rotor 14" will assuredly self-start on energization of the field coil, the same will nevertheless usually hesitate before starting, though mostly not as long as the previously described rotor 14' with its wider pole ends. Hence, the motor shown in Fig. 9, while satisfactory for many purposes, is objectionable for timepieces and some other timing devices in which assured instantaneous self-starting of the motor at each occasion is of the essence.

Any possible stop and retention of a rotor in a central repose position with respect to the nearest field poles is precluded in the first place by making the pole ends of the rotor of smaller width than the gaps 56 between the pole sections of either field poles 16 or 18, as shown in Figs. 5 and 6. Hence, the rotor shown in these figures will, on deenergization of the field coil, unfailingly assume and be held in an off-center repose position with respect to the nearest field poles, and thus assure, on reenergization of the field coil, self-starting of the rotor with the instantaneous response required of and desired for motors that are used in timepieces and other timing devices.

In order to provide sufficient mass in the rotor 14 to achieve substantially constant torque during running and yet keep the rotor sufficiently jumpy on energization of the field coil to assure its instantaneous starting response, the rotor is wider in the center and is tapered toward the narrower pole ends 40 and 42 (Figs. 5 and 6). A somewhat modified form of rotor 14''' is shown in Fig. 7 in which the sides 60 and 62 of the rotor are tapered toward the pole ends first gradually and then more abruptly as at 64 and 66, respectively.

While in the described motor 10 all field poles 16 and 18 are notched at 56 to provide the pole sections 52 and 54, respectively, Fig. 10 shows a motor 10' of which only the field poles 16', for instance, are notched at 56' to provide spaced pole sections 52''' thereat. Since both pole ends 70 and 72 of the rotor 74 are identical and of smaller width than any of the gaps 56', it follows that the rotor will, on deenergization of the field coil, always assume a repose position in which the same is off-center from the nearest field poles. Hence, the instant modified motor 10' is as assuredly self-starting as the previously described motor 10.

Since in the motor 10 (Figs. 1 to 6) all field poles 16 and 18 are notched and thereby divided into the pole sections 52 and 54, respectively, only one of the pole ends 40 or 42 of the rotor 14 need be as narrow as described while the other pole end may well be wider, and the motor will nevertheless self-start instantaneously on energization of the field coil, as will be readily understood.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a self-starting alternating current motor, the combination of a field structure comprising a plurality of spaced field poles arranged circularly about an axis; means for magnetizing said field poles so as to produce alternating opposite polarities in alternate poles; and a permanent-magnet rotor having opposite pole ends and being rotatable about said axis, each pair of field poles of opposite polarities simultaneously passed by the turning rotor including spaced adjacent pole sections of the same polarities, and at least one pole end of said rotor being so narrow as to be entirely attracted to either one of the pole sections of an adjacent demagnetized field pole and assume a repose position in which said rotor is off-center from said adjacent field pole.

2. In a self-starting alternating current motor, the combination of a field structure comprising a plurality of spaced field poles arranged circularly about an axis; means for magnetizing said field poles so as to produce alternating opposite polarities in alternate poles; and a permanent magnet rotor having opposite pole ends and being rotatable about said axis, at least one of said pair of field poles of opposite polarities simultaneously passed by the turning rotor being notched to provide spaced pole sections thereat, and either pole end of said rotor being so narrow as to be entirely attracted to either one of the pole sections of an adjacent demagnetized field pole and assume a reposed position in which said rotor is off center from said adjacent field pole.

3. In a self-starting alternating current motor, the combination of a field structure comprising a plurality of spaced field poles arranged circularly about an axis; means for magnetizing said field poles so as to produce alternating opposite polarities in alternate poles; and a permanent magnet rotor having opposite pole ends and being rotatable about said axis, at least one of said pair of field poles of opposite polarities simultaneously passed by the turning rotor being notched to provide spaced pole sections thereat, and each pole end of said rotor being so narrow as to be entirely attracted to either one of the pole sections of an adjacent demagnetized field pole and assume a repose position in which said rotor is off-center from said adjacent field pole.

4. In a self-starting alternating current motor, the combination of a field structure comprising a plurality of spaced field poles arranged circularly about an axis; means for magnetizing said field poles so as to produce alternating opposite polarities in alternate poles; and a permanent-magnet rotor having opposite pole ends and being rotatable about said axis, each of said field poles being notched to provide spaced pole sections thereat, and at least one pole end of said rotor being so narrow as to be entirely attracted to either one of the pole sections of an adjacent demagnetized field pole and assume a repose position in which said rotor is off-center from said adjacent field pole.

5. In a self-starting alternating current motor, the combination of a field structure comprising a plurality of equally spaced field poles of identical widths arranged circularly about an axis; means for magnetizing said field poles so as to produce alternating opposite polarities in alternate poles; and a permanent-magnet rotor having opposite pole ends and being rotatable about said axis, at least one of each pair of field poles of opposite polarities simultaneously passed by the turning rotor being notched to provide spaced pole sections thereat and all pole sections being of the same width, and each pole end of said rotor being no wider than the gap between the pole sections of any notched field pole so as to be entirely attracted to either one of the pole sections of an adjacent demagnetized field pole and assume a repose position in which said rotor is off-center from said adjacent field pole.

6. The combination in a self-starting alternating current motor as set forth in claim 5, in which each pole end of said rotor is of smaller width than the gap between the pole sections of any notched field pole.

7. The combination in a self-starting alternating current motor as set forth in claim 5, in which the width of each pole end of said rotor is smaller than the gap between the pole sections of any notched field pole and is not greater than that of any of said pole sections.

8. The combination in a self-starting alternating current motor as set forth in claim 5, in which the width of each pole end of said rotor is smaller than the gap between the pole sections of any notched field pole and is also smaller than that of any of said pole sections.

9. In a self-starting alternating current motor, the combination of a field structure comprising a plurality of equally spaced field poles of identical widths arranged circularly about an axis; means for magnetizing said field poles so as to produce alternating opposite polarities in alternate poles; and a permanent-magnet rotor having opposite pole ends and being rotatable about said axis, each of said field poles being notched to provide spaced pole sections thereat and all pole sections being of the same width, and each of said pole ends of said rotor being no wider than the gap between the pole sections of any notched field pole so as to be entirely attracted to either one of the pole sections of an adjacent demagnetized field pole and assume a repose position in which said rotor is off-center from the nearest field poles.

10. The combination in a self-starting alternating current motor as set forth in claim 9, in which each of said pole ends of said rotor is of smaller width than the gap between the pole sections of any notched field pole.

11. The combination in a self-starting alternating current motor as set forth in claim 9, in which the width of each of said pole ends of said rotor is smaller than the gap between the pole sections of any notched field pole and is not greater than that of any of said pole sections.

12. The combination in a self-starting alternating current motor as set forth in claim 9, in which the width of each of said pole ends of said rotor is smaller than the gap between the pole sections of any notched field pole and is also smaller than that of any of said pole sections.

13. The combination in a self-starting alternating current motor as set forth in claim 9, in which said rotor is wider in the center than at its pole ends and is tapered toward the latter.

14. In a self-starting alternating current motor, the combination of a field structure comprising two series of field poles of odd numbers, the poles of one series being arranged in alternation with those of the other, said field poles of each series being equally spaced and of identical widths and arranged circularly about an axis so that field poles of one of said series are diametrically opposite the poles of said other series; means for magnetizing said field poles so as to produce alternating opposite polarities in alternate poles; and a permanent-magnet rotor rotatable about said axis and having diametrically opposite pole ends, each of said field poles being notched to provide spaced pole sections thereat and all pole sections being of the same width, and each of said pole ends of said rotor being no wider than the gap between the pole sections of any notched field pole so as to be entirely attracted to either one of the pole sections of an adjacent demagnetized field pole and assume a repose position in which said rotor is off-center from the nearest field poles.

15. The combination in a self-starting alternating current motor as set forth in claim 14, in which each of said pole ends of said rotor is of smaller width than the gap between the pole sections of any notched field pole.

16. The combination in a self-starting alternating current motor as set forth in claim 14, in which the pole sections of the notched field poles are of the same widths as the gaps between them, and each of said pole ends of said rotor is of smaller width than any of said pole sections.

17. The combination in a self-starting alternating current motor as set forth in claim 14, in which said rotor is wider in the center than at its pole ends and is tapered toward the latter.

References Cited in the file of this patent

UNITED STATES PATENTS

| | | |
|---|---|---|
| 1,933,590 | Holtz et al. | Nov. 7, 1933 |
| 2,677,776 | Kohlhagen | May 4, 1954 |